United States Patent [19]
Ota

[11] 3,780,474
[45] Dec. 25, 1973

[54] TABLE POSITIONING DEVICE FOR GRINDING MACHINE

[75] Inventor: Hiroshi Ota, Kariya, Japan

[73] Assignee: Toyoda Koki Kabushiki Kaisha, Aichi-ken, Japan

[22] Filed: June 17, 1971

[21] Appl. No.: 153,992

[30] Foreign Application Priority Data
June 23, 1970 Japan.............................. 45/54636

[52] U.S. Cl............................ 51/105 SP, 51/165.77
[51] Int. Cl............................................... B24b 5/42
[58] Field of Search.................... 51/105 R, 105 SP, 51/165, 165.77, 165.8, 165.81

[56] References Cited
UNITED STATES PATENTS
2,559,431   7/1951   Hollengreen..................... 51/105 SP
2,837,875   6/1958   Happel............................. 51/165 R
2,754,633   7/1956   Balsiger........................... 51/105 SP

*Primary Examiner*—Harold D. Whitehead
*Attorney*—Norman F. Oblon et al.

[57] ABSTRACT

A table positioning device for a grinding machine to grind work pieces with multiple grinding portions is provided which comprises measuring means for measuring a first grinding position of the work pieces, a fine transferring device regulated by the measuring means to position the table of the grinding machine in a first grinding position, and a table indexing device including an index plate mounted on the table with notches at corresponding intervals of the multiple grinding portions and an index pin adjustably provided on a bed of the grinding machine, the index pin being engageable with the notches to set the table at the corresponding grinding positions.

9 Claims, 6 Drawing Figures

TABLE POSITIONING DEVICE FOR GRINDING MACHINE

BACKGROUND OF THE INVENTION

This invention relates generally to a table positioning device for a grinding machine and more particularly to an improved table positioning device which is adapted for use with grinding machines to grind work pieces having multiple grinding portions.

Generally in grinding workpieces with multiple grinding portions, for example, crank-shafts with multiple crank pins and the like, difficulties have been experienced in positioning the work pieces precisely and easily in the appropriate grinding operation position. Among the primary reasons causing such difficulties are the differences or non-uniformity of the grinding portions and the depths of the center-holes of the work pieces. Thus, each grinding portion of the work piece heretofore had to be positioned by a grinding position measuring device of the grinding machine to a desired position therefor. The operation is time-consuming and therefore many hours of labor are wasted in correctly positioning the work pieces thereby operating to lower the production efficiency.

SUMMARY OF THE INVENTION

An object of this invention is, therefore, to provide a table positioning device for alleviating the loss of time heretofore encountered in properly positioning work pieces having multiple grinding portions in grinding machines.

Another object of this invention is to provide a table positioning device for determining a first grinding position of a work piece being adjusted for deflection of the workpiece face in accordance with a sizing signal generated by a grinding position measuring device and for positioning following portions of the work piece to be ground easily and precisely in accordance with the operation of a table indexing device.

Still another object of this invention is to provide a table positioning device wherein successive grinding portions of the work piece can be automatically positioned in predetermined grinding positions after a first grinding position of the work piece is once set up through cooperation of the measuring device and a fine transferring device for the table.

A further object of this invention is to provide a table positioning device having the aforementioned characteristics, wherein the device is adaptable to various types of grinding machines generally in use.

The foregoing and other objects are attained in accordance with this invention through the provision of a table positioning device for a grinding machine having a measuring means for automatically measuring the deflection of a reference position on the face of a workpiece and a fine table transferring device regulated thereby for moving the table to a position wherein the first portion of a workpiece having a plurality of portions to be ground is correctly positioned for grinding by the grinding wheel. Further, a table indexing device for successively moving the table and the workpiece supported thereon to position subsequent grinding portions of the workpiece is provided which comprises an index plate on the table having a plurality of notches at intervals corresponding to the grinding portions of the workpiece, an index pin on the bed of the machine being engageable with the notches in the index plate, and means for disengaging the pin from a notch following a completion of the grinding operation on one of the workpiece portions, moving the table and workpiece, and reengaging the pin with a succeeding notch corresponding to the next workpiece portion to be ground whereby the grinding portions are easily and precisely automatically positioned for grinding.

BRIEF DESCRIPTION OF THE DRAWINGS

Various other objects, features and attendant advantages of this invention will be more fully appreciated as the same becomes better understood from the following detailed description, especially when considered in conjunction with the accompanying drawings, in which like reference numerals designate like or corresponding parts throughout the several views, and wherein.

DESCRIPTION OF AN ILLUSTRATED EMBODIMENT

Figure 1:
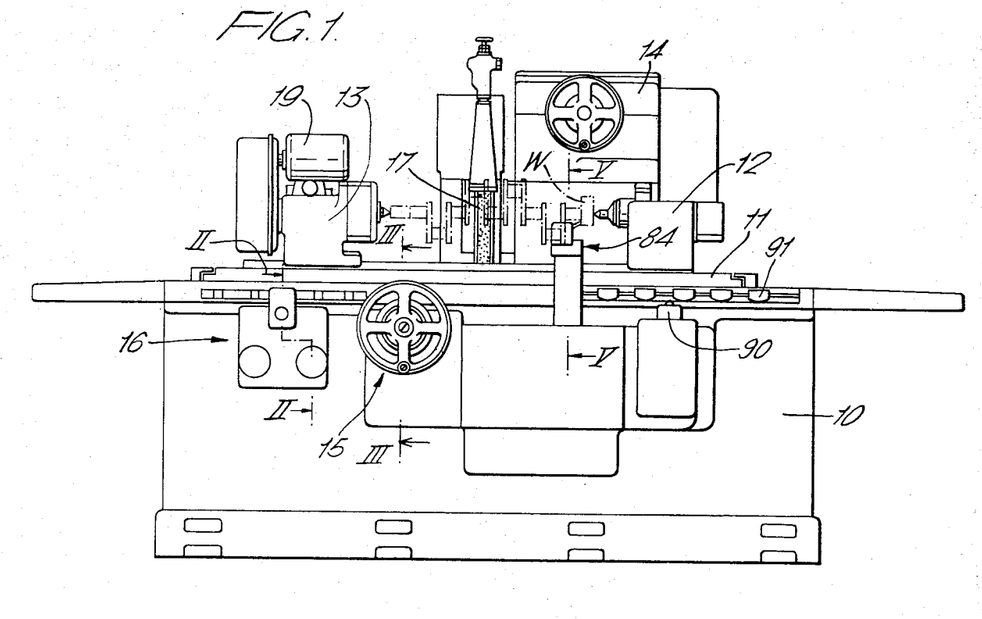
FIG. 1 shows a full front view of a grinding machine constructed according to this invention.

Referring now to the drawings, and more particularly to FIG. 1 thereof, there is shown a bed 10 of the grinding machine of this invention. Slidably positioned on the bed 10 are a table 11 and a grinding wheel carriage 14. Conventional driving devices which are not shown are also provided on the bed 10 for providing relative sliding movements of the table 11 and the grinding wheel carriage 14. A spindle head 13 and a tail stock 12 are mounted on the table 11. A driving motor 19 rotates a workpiece W which is rotatably supported by the spindle head 13 and the tail stock 12. The grinding wheel carriage 14 rotatably supports a grinding wheel 17 and has a driving motor, not shown, to rotate the grinding wheel. The sliding movement of the grinding wheel carriage 14 is in a radial direction against the workpiece W, the cutting stroke of the grinding wheel 17 being consequently controlled by this radial sliding movement of the grinding wheel carriage 14. Longitudinal sliding movement of the workpiece W is provided by the table 11, whereby the grinding positions of the workpiece W or the disposition thereof relative to the grinding wheel are thus determined by the longitudinal sliding movement of the table 11.

As hereinbefore mentioned, the workpiece W has a plurality of portions to be ground. A table indexing device 16 accordingly is adjustably installed on the bed 10 to correctly position the portions of the workpiece W which are to be ground in a predetermined grinding position.

Figure 2:
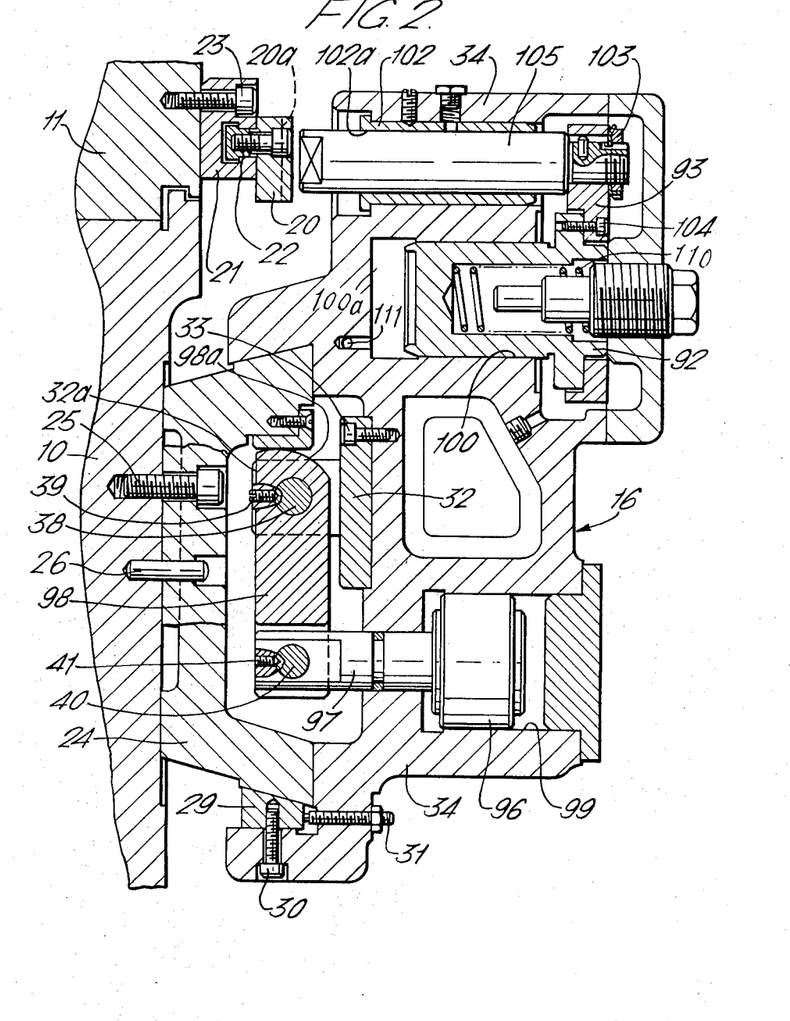
FIG. 2 is an enlarged cross-sectional view of the portion taken along the line II—II of FIG. 1 showing the table indexing device of this invention.

The device 16 is now described more in detail with reference to FIG. 2. A guiding plate 24 is firmly secured on the bed 10 by bolts 25 and pins 26. A main body 34 of the device 16 is slidably mounted on the guiding plate 24 through a block member 29 having a slanted surface contacting the guiding plate, fastening bolts 30 through the body 34 and threaded into the block member 29, and adjusting bolts 31 threaded through the main body 34.

The main body 34 is further provided with a hydraulic cylinder 99 in which a piston 96 is reciprocably disposed. A piston rod 97 of the piston 96 extends toward the guiding plate 24 and a clamp bar 98 is swingably pivoted at one end thereof on the extending end portion of the piston rod 97 by a pin 40. A screw 41 in the end of the piston rod engages the pin 40 and prevents it from falling out of place. The other end of the clamp bar 98 is supported by a pin 38 and a boss 32a of a bracket 32 firmly fixed on the main body 34. A screw 39 prevents the pin 38 from falling out of the boss 32a. A cam face 98a is shaped on the other end of the clamp bar 98. The cam face 98a on the end of the clamp bar 98 held in the boss 32a works to urge the guiding plate 24 so as to consequently lock the main body 34 on the bed 10 when the piston 96 is moved forward, or when it moves to the left as viewed in FIG. 2. On the other hand, when the piston 96 is retracted, or is moved to the right, as seen in FIG. 2, the main body 34 is released from the bed 10.

The main body 34 of the table indexing device 16 is also provided with another hydraulic cylinder 100 having a piston 92 reciprocably disposed therein. The piston 92 has a boss, on which a plate 93 is secured by bolts 104, the plate 93 being fastened on one end of an elongate index pin 105 by a locking nut 103. Consequently, the index pin 105 slides forward and backward within a bore 102a of a guiding sleeve 102 positioned in the main body 34 correspondingly following the reciprocation of the piston 92. The piston 92 is urged leftward by a spring 110 disposed in a bore therein and acting between the bore well and a cover plate of the main body 34, and is retracted by pressurized fluid supplied into a pressure chamber 100a through a port 111.

A block member 21 is firmly fixed on the side face of the table 11 by bolts 23 and an elongate index plate 20 is secured on the block member 21 by bolts 22. The index plate 20 is provided with notches 20a on the open side thereof at corresponding intervals with the multiple portions of the workpiece to be ground. The notches 20a are engageable with the other end of the index pin 105 so as to correctly position the table 11 in its longitudinal path of movement relative to the grinding wheel for grinding the respective portions of the work piece.

In performing a grinding operation on the work piece W, a positioning of the first portion thereon to be ground relative to the grinding wheel is realized by adjusting the position of the main body 34 of the table indexing device 16 against the bed 10. This adjustment is made by a fine transferring device 15 which is installed on the bed 10 and enables fine adjustment of the position of the first portion with respect to the grinding wheel 17, the details of which are now described with reference particularly to FIGS. 3 and 4.

Figure 3:
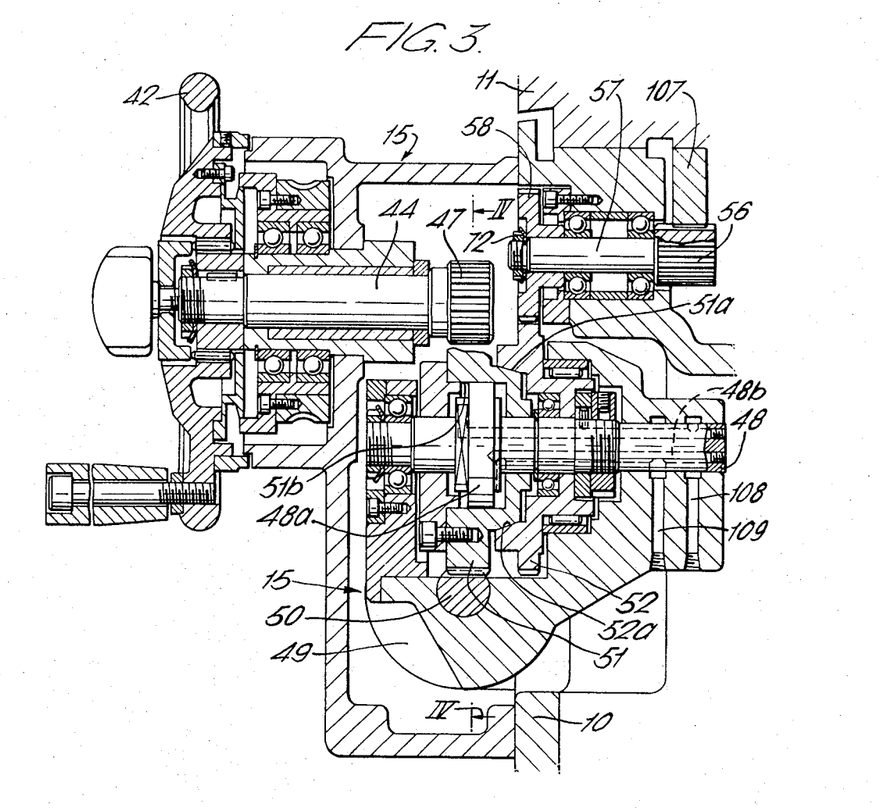
FIG. 3 is an enlarged cross-sectional view of the portion taken along the line III—III of FIG. 1 showing the fine table transferring device of this invention.
Figure 4:
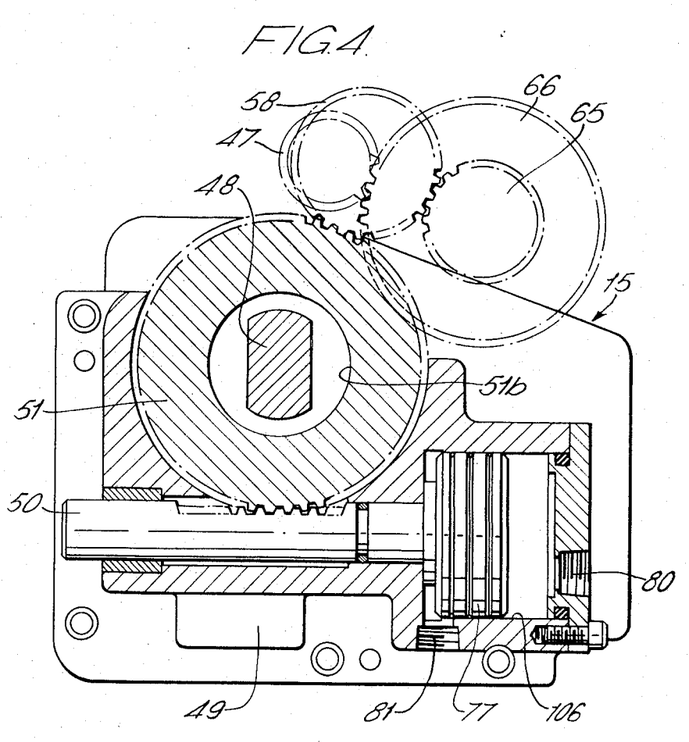
FIG. 4 is a cross-sectional view taken along the line IV—IV of FIG. 3.

A main body 49 of the fine transferring device 15 is mounted on the bed 10 by suitable means, such as bolts, not shown. As best shown in FIG. 4, the device 15 is provided with a hydraulic cylinder 106 which has a piston 77 reciprocably disposed therein. A piston rod 50 of the piston 77 is provided with a rack portion for engaging a gear 51. The piston 77 is operated by reversing the supply of fluid between ports 80 and 81 provided on the cylinder 106. The gear 51 is in mesh with the rack portion of the piston rod 50 is slidably mounted on a shaft 48. A tapered face 51a is formed on one end of the gear 51 and a clutch cylinder, or bore, 51b is formed axially within the other end of the gear. The clutch cylinder 51b slidably supports a clutch piston 48a integrally formed with the shaft 48. A gear 52 having a tapered face 52a which corresponds with the tapered face 51a of the gear 51 and receives the same therein is rotatably journalled on the shaft 48. A clutching operation between the gears 51 and 52 is achieved by charging and discharging fluid under pressure to and from the cylinder 51b on opposite sides of the clutch piston 48a, in a manner to be set forth hereinbelow. The gear 52 is in mesh with a gear 58 secured on one end of a shaft 57 by a fastening nut 72. Another gear 56 is formed on the other end of the shaft 57 being engaged with a rack member 107 fixed on the bottom portion of the table 11.

The main body 49 of the fine transferring device 15 has an inlet port 109 communicating with a fluid pressure passageway 48b drilled longitudinally in the shaft 48 which extends to a right chamber, as viewed in FIG. 3, of the clutch cylinder 51b, in the gear 51. Thus, fluid under pressure supplied to the right chamber from the port 109 moves the gear 51 to tightly engage the gear 52 for effecting the clutching operation. At the same time, fluid pressure supplied to the port 81 operates the piston rod 50 and this fluid pressure force thereby is transmitted to the rack 107 through the gears 51, 52, 58 and 56. This carries out a fine positioning adjustment of the table 11.

Also, turning wheel 42 secured on one end of a wheel shaft 44 is provided for manually moving the table 11. The rotational force of the turning wheel 42 is transmitted to the rack 107 through a gear 47 fixed on the other end of the wheel shaft 44, gears 66 and 65 rotatably journalled on the bed 10 and the gear 58, as seen in FIG. 4. Thus, the position of the table 11 can be manually adjusted, as desired.

Figure 5:
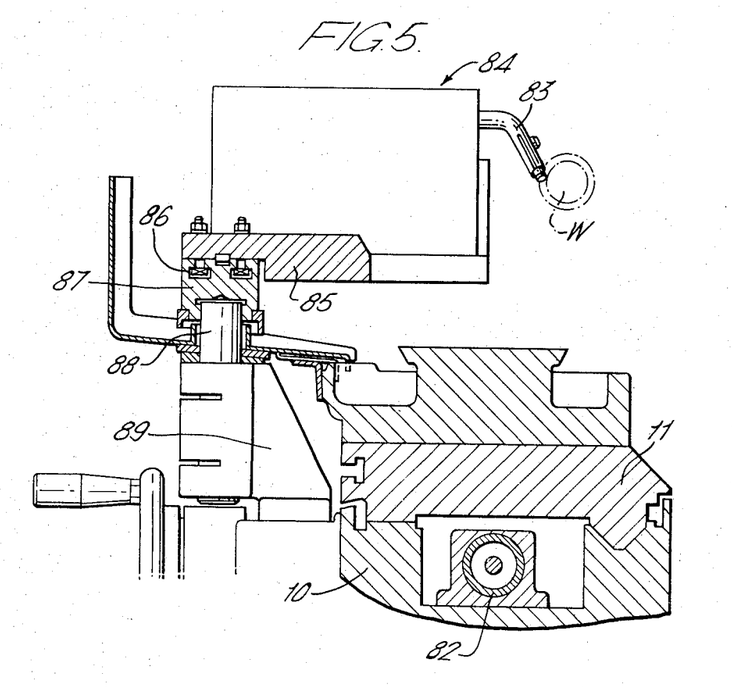
FIG. 5 is an enlarged cross-sectional view of the portion taken along the line V—V of FIG. 1 showing an automatic measuring means used in the present invention.

The amount of fine adjustment on the table 11 is measured by conventional automatic measuring means 84 shown in FIG. 5 being slidably positioned on a support member 85 which is firmly secured on a block member 87 by bolts 86. The block member 87 is mounted on the top end of a vertical shaft 88. The shaft 88 is vertically adjusted secured on a bracket 89 secured on the bed 10.

A pivoted feeler 83 is supported on the measuring means 84. The feeler 83 generates a sizing signal when the workpiece is moved to the grinding position, that is, when the first portion on the workpiece to be ground and the grinding wheel are aligned with each other so as to perform the grinding operation on the first portion thereon. The measuring means 84 is further connected to a hydraulic cylinder, not shown, for being moved toward and away from the workpiece W to make the feeler 83 confront with a surface of the workpiece W to be positioned.

Grinding of the workpiece W is done by the grinding wheel 17 after the workpiece W is correctly positioned by the fine transferring device 15. However, as previously mentioned, because of differences in the depths of the center holes of workpieces W, problems arise in properly positioning the workpiece W. With the device of this invention, however, correct positioning of the workpiece W is quickly and precisely carried out in the following manner.

The first correct positioning for the first portion of the workpiece to be ground is effected by the measuring means 84 as hereinafter described. After the workpiece W is supported between the spindle head 13 and the tail stock 12, a starting button, not shown, is pushed. The measuring means 84 moves forward, and then the piston 77, FIG. 4, is moved rightward by the application of pressurized fluid through the port 81, whereby the work table 11 is moved to the left, in FIG. 1. The feeler 83 is displaced by the surface of the workpiece to be positioned, and when the first portion of the workpiece to be ground is positioned properly in the grinding operation position, the measuring means 84 generates a sizing signal by which the work table 11 is stopped. During this period, the index pin 105 of the table indexing device 16 is engaged with the first notch of the index plate 20 fixed on the table 11 and the clamp bar 98 is unclamped. Thus, the main body 34 of the table indexing device 16 moves together with the table 11 and when the sizing signal is generated, the cylinder 99 is operated and the clamp bar 98 becomes clamped. Upon clamping of the main body 34 of the table indexing device 16 on the bed 10, the grinding wheel carriage 14 is moved forward to complete the first grinding operation of the workpiece W. At this time, pressurized fluid is supplied into the left chamber, in FIG. 3, of the cylinder 51b through a port 108 so as to disengage the clutch 51a, 52a. After the grinding wheel carriage 14 is retracted, the index pin 105 disengages from the index plate 20 and the table 11 is moved by a fast forwarding cylinder 82 to bring the next portion of the workpiece W to be ground into the grinding position. Then, the index pin 105 is re-engaged with the index plate 20 in the next notch therein so as to position the table 11 precisely for the second grinding operation. This particular process is controlled by dogs 91 installed on the table 11 and a limit switch 90 provided on the bed 10 as shown in FIG. 1. The dogs 91 are spaced in equidistant relation to the spaced notches 20a of the index plate 20. When the limit switch 90 is operated by the dog 91 to provide a signal, the port 111 is connected to a reservoir, not shown, and the table speed is decreased. The index pin 105, being urged by the spring 110 toward the index plate 20, engages another notch 20a in accordance with their alignment. Then the grinding wheel carriage 14 is moved forward again. Consequently, the portions of the workpiece W to be ground are successively finished, being positioned one after another in given order based on the reference position determined by the indexing device 16, the position of which has been initially adjusted in accordance with the deflection of the center hole of the workpiece W. Then, the work table 11 is moved to the original position thereof, and the index pin 105 engages with the first notch 20a of the index plate 20. The pressurized fluid is supplied to the right chamber of the cylinder 51b through the port 109 so as to re-engage the clutch. After that the piston 77 is retracted to its starting position, shown in FIG. 4, by the pressurized fluid being supplied through the port 80, and the work table 11 is also returned to its starting position thereby. After the finished workpiece W is removed, a next one will be ground similarly.

Figure 6:
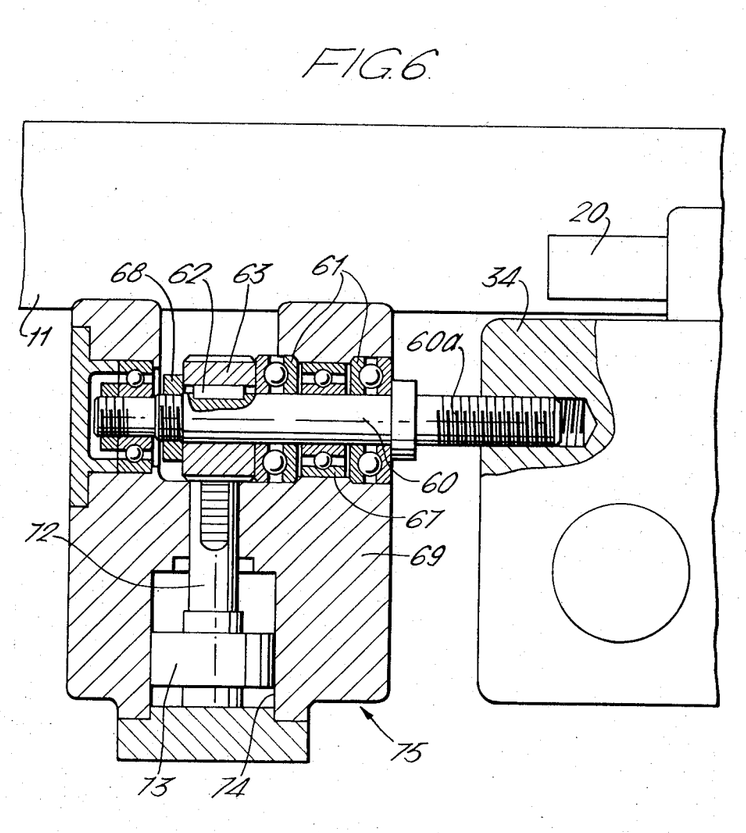
FIG. 6 is a partial cross-sectional view of another embodiment of a fine transferring device.

A modified embodiment of the fine transferring device 15 is illustrated in FIG. 6. Here, the fine transferring device 75 is installed on the bed 10 adjacent the table indexing device 16. A main body 69 of the fine transferring device 75 is provided with thrust bearings 61 and a radial bearing 67 which permit a shaft 60 to rotate therein. A screw threaded portion 60a is provided on an extended end portion of the shaft 60, and is threaded into the main body 34 of the device 16. A pinion gear 63 is mounted on the shaft 60 and is prevented from being axially displaced by a fastening nut 68 and from loose or idle rotation by a key 62. The main body 69 is provided with a vertically oriented cylinder 74 which has a piston 73 reciprocably engaged therein. A piston rod 72 of the piston 73 has a rack portion engraved thereon which is in mesh with the pinion gear 63.

When the cylinder 74 operates, such as through the application of fluid pressure in the conventional manner, the pinion gear 63 rotates as well as the screw portion 60a of the shaft 60. The screw portion 60a is threaded into the main body 34 of the table indexing device 16 and the rotation of the screw portion 60a causes free movement of the main body 34. At the same time, the clamp bar 98 of the table indexing device 16 is unclamped from the bed 10 and the index pin 105 is engaged with the index plate 20. This determines and adjusts the position of the table 11.

The amount of this adjustment movement for the position of the table 11 is also controlled by the measuring means 84 to cover the deflection of the center hole of the workpiece W. When the first portion of the workpiece to be ground is precisely positioned into the grinding position by the adjustment movement of the table 11, the clamp bar 98 of the device 16 is clamped securing the same to the bed 10 and then the grinding operation for the first portion is effected. The positioning of the other grinding portions of the workpiece W can properly be carried out through the cooperation of the device 16 and the index plate 20 without thereafter using the measuring means 84.

As described above, the grinding machine in accordance with the present invention is designed to hold a workpiece W having a plurality of portions to be ground by way of the spindle head 13 and the tail stock 12 in the usual manner. The automatic measuring means 84 then measures the deflection of the reference position of the face of the workpiece W to determine the position of the first portion of the workpiece W to be placed in operative relation with the grinding wheel in the correct initial grinding position. The position of the table 11 is thus corrected in accordance with the deflection measured by the measuring means 84. At the same time, the table indexing device 16 for positioning the table 11 at the predetermined points for successive grinding operations on other portions of the workpiece is conditioned to the adjusted position therefor on the bed 10. Then, the table indexing device 16 and the index plate 20 of the table 11 operate together for positioning the second and following grinding portions of the workpiece W in the predetermined grinding position. Thus, all the second and and following portions of the workpiece W to be ground can be automatically and accurately moved to the grinding position therefor, whereby the table positioning steps can be carried out in a much shorter time and the grinding effeciency of the machine can be vastly increased.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed as new and desired to be secured by Letters Patent of the United States is:

1. In combination with a grinding machine having a table slidably installed on a bed and provided with supporting means for holding a workpiece having multiple portions to be ground, a grinding wheel for grinding said workpiece and mounted on a grinding wheel carrier which is movable toward and away from the workpiece for a grinding operation thereon, and table driving means for moving said table in a longitudinal direction of the workpiece, a table positioning means comprising:
   an indexing housing slidably mounted on one of said bed and said table in a line parallel to said longitudinal direction;
   an index plate secured on the other of said bed and said table and having a series of notches therein, said notches being positioned at intervals spaced in correspondence with said multiple portions of said workpiece to be ground;
   an index pin slidably mounted within said housing for engaging and disengaging said notches;
   a fine transferring device for precisely adjusting the position of said indexing housing together with said table through engagement between the first notch of said index plate and said index pin to bring a first portion of said workpiece into a grinding position aligned with the grinding wheel; and
   automatic measuring means mounted on said bed for generating a sizing signal for stopping the operation of said fine transferring device when said first portion has been located into the grinding position;
   whereby said first portion of said workpiece is positioned in the grinding position by said fine transferring device in accordance with said sizing signal and said indexing housing is simultaneously adjustably positioned together with said table.

2. A table positioning means for a grinding machine as set forth in claim 1, which further comprises:
   a locking means for locking said housing on one of said bed and said table in response to said sizing signal; and
   detecting means for sensing the movements of said table; whereby said indexing housing is locked to one of said bed and said table when said first portion of said workpiece is positioned in the grinding position and said table is thereafter moved to successively position the following portions of said workpiece to be ground to the grinding position through the engagement of said index pin and each of the following notches of said index plate in accordance with signals issued by said detecting means.

3. A table positioning device of the grinding machine as set forth in claim 2, further comprising a hydraulic actuator within said housing for driving said slidable index pin, said hydraulic actuator being regulated by said detecting means.

4. A table positioning means as set forth in claim 3, wherein said hydraulic actuator comprises:
   a cylinder disposed within said housing; and
   a piston reciprocably disposed within said cylinder and being connected to said index pin;
   the movement of said piston being controlled by said detecting means.

5. A table positioning means for the grinding machine as set forth in claim 2, wherein said locking means comprises:
   a hydraulic cylinder positioned in said housing;
   a piston reciprocably disposed within said cylinder and having a rod extending toward said bed; and
   a clamp bar pivoted on said piston rod and having a cam face thereon engageable with a portion of said bed, said piston operating to engage said cam face with said bed portion for establishing a relationship between said bed portion and said table in accordance with said sizing signal and disengage said cam face from said bed portion when the grinding operations on all portions of said workpiece have been completed.

6. A table positioning means of the grinding machine as set forth in claim 2, wherein said detecting means comprises:
   a plurality of dogs on one of said table and said bed; and
   a limit switch on the other of said table and said bed, said dogs being arranged at a similar separation as the intervals of the notches on said index plate.

7. A table positioning device as set forth in claim 1, wherein said fine transferring device comprises
   a main body mounted on said bed and having a cylinder therein;
   a piston slidably mounted in said cylinder and having a rack portion thereon;
   a shaft journalled on said main body and provided with a clutch piston;
   a first gear slidably mounted on said shaft engaging said rack and having a clutch cylinder therein and a tapered peripheral face projecting from its end surface;
   said clutch piston being slidably mounted in said clutch cylinder and dividing it into two chambers;
   a second gear rotatably mounted on said shaft and having a tapered cave confronting said tapered peripheral face of said first gear;
   a third gear rotatably mounted on said bed and meshed with a table rack secured to said table; and
   a gear train between said second and third gears.

8. A table positioning device as set forth in claim 7, wherein said fine transferring device further comprises:
   a wheel shaft journalled on said main body;
   a turning wheel mounted on said wheel shaft;
   a gear secured to said wheel shaft; and
   gear train means between said wheel shaft gear and said third gear.

9. A table positioning device as set forth in claim 2 wherein said fine transferring device comprises:
   a main body mounted on said bed;
   a shaft having a threaded portion threadably engaging said indexing housing and a pinion member secured thereon spaced from said threaded portion; and a piston reciprocably disposed within a cylinder provided in said main body and having a rod with a rack portion thereon being meshed with said pinion member; said piston being regulated by the operation of said measuring means and said indexing housing being moved by the rotation of said threaded shaft.

* * * * *